United States Patent
Sirota et al.

(10) Patent No.: US 8,752,623 B2
(45) Date of Patent: Jun. 17, 2014

(54) SOLVENT SEPARATION IN A SOLVENT-DOMINATED RECOVERY PROCESS

(75) Inventors: Eric B. Sirota, Flemington, NJ (US); Owen J. Hehmeyer, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 431 days.

(21) Appl. No.: 12/987,714

(22) Filed: Jan. 10, 2011

(65) Prior Publication Data

US 2011/0198091 A1 Aug. 18, 2011

(30) Foreign Application Priority Data

Feb. 17, 2010 (CA) .................................. 2693640

(51) Int. Cl.
*E21B 43/40* (2006.01)
*E21B 43/34* (2006.01)
(52) U.S. Cl.
USPC ........ 166/267; 166/75.11; 166/369; 166/403; 208/92
(58) Field of Classification Search
None
See application file for complete search history.

(56) References Cited

U.S. PATENT DOCUMENTS

| | | | |
|---|---|---|---|
| 849,524 A | 4/1907 | Baker | |
| 2,188,012 A * | 1/1940 | Stanislaw et al. | 208/323 |
| 2,412,765 A | 7/1941 | Buddrus | |
| 2,365,591 A | 8/1942 | Ranney | |
| 2,358,183 A * | 9/1944 | Ostergaard | 208/52 R |
| 2,655,465 A * | 10/1953 | Martin | 208/55 |
| 3,074,481 A | 1/1963 | Habermann | |
| 3,185,634 A | 5/1965 | Craig, Jr. et al. | |
| 3,274,101 A | 9/1966 | West et al. | |
| 3,323,588 A | 6/1967 | Rai et al. | |
| 3,342,256 A | 9/1967 | Bernard et al. | |
| 3,434,544 A | 3/1969 | Satter et al. | |
| 3,608,638 A | 9/1971 | Terwilliger | |
| 3,671,419 A * | 6/1972 | Ireland et al. | 208/57 |
| 3,704,990 A | 12/1972 | Sarem et al. | |
| 3,705,625 A | 12/1972 | Whitten et al. | |
| 3,707,189 A | 12/1972 | Prats | |
| 3,739,852 A | 6/1973 | Woods et al. | |

(Continued)

FOREIGN PATENT DOCUMENTS

| | | |
|---|---|---|
| CA | 940853 | 1/1974 |
| CA | 1015656 | 8/1977 |

(Continued)

OTHER PUBLICATIONS

Boberg, T.C., et al. (1966) "Calculation of the production of a thermally stimulated well", *Journal of Petroleum Technology*, vol. 18, No. 12 1613-1623, December.

(Continued)

*Primary Examiner* — Angela M DiTrani
*Assistant Examiner* — Anuradha Ahuja
(74) *Attorney, Agent, or Firm* — ExxonMobil Upstream Research Company—Law Department

(57) ABSTRACT

In solvent-dominated recovery processes for recovering In situ oil, including bitumen, the produced fluid stream includes oil and solvent. The solvent is preferably recovered and reinjected into the reservoir. In previously described methods, solvent is removed from the oil/solvent mixture. In the present method, the oil/solvent mixture is first separated into a heavier stream and a lighter stream from which solvent is independently removed.

33 Claims, 3 Drawing Sheets

(56) References Cited

U.S. PATENT DOCUMENTS

| | | | |
|---|---|---|---|
| 3,782,465 A | 1/1974 | Bell et al. | |
| 3,811,503 A * | 5/1974 | Burnett et al. | 166/252.1 |
| 3,818,989 A | 6/1974 | Christopher, Jr. et al. | |
| 3,823,777 A * | 7/1974 | Allen et al. | 166/266 |
| 3,878,892 A * | 4/1975 | Allen et al. | 166/267 |
| 3,908,762 A | 9/1975 | Redford | |
| 3,945,435 A | 3/1976 | Barry | |
| 3,946,809 A | 3/1976 | Hagedorn | |
| 3,948,319 A | 4/1976 | Pritchett | |
| 3,954,141 A * | 5/1976 | Allen et al. | 166/403 |
| 3,956,145 A | 5/1976 | Christopher, Jr. et al. | |
| 3,958,636 A | 5/1976 | Perkins | |
| 3,960,214 A | 6/1976 | Howell et al. | |
| 3,986,557 A | 10/1976 | Striegler et al. | |
| 4,004,636 A | 1/1977 | Brown et al. | |
| 4,007,785 A | 2/1977 | Allen et al. | |
| 4,007,787 A | 2/1977 | Cottle | |
| 4,008,764 A | 2/1977 | Allen | |
| 4,010,799 A | 3/1977 | Kern et al. | |
| 4,017,383 A * | 4/1977 | Beavon | 208/309 |
| 4,017,583 A * | 4/1977 | Motojima et al. | 423/2 |
| 4,020,901 A | 5/1977 | Pisio et al. | |
| 4,026,358 A | 5/1977 | Allen | |
| 4,034,812 A | 7/1977 | Widmyer | |
| 4,037,658 A | 7/1977 | Anderson | |
| 4,067,391 A | 1/1978 | Dewell | |
| 4,085,803 A | 4/1978 | Butler | |
| 4,099,568 A | 7/1978 | Allen | |
| 4,109,720 A | 8/1978 | Allen et al. | |
| 4,125,044 A | 11/1978 | Carrigan et al. | |
| 4,125,458 A | 11/1978 | Bushnell et al. | |
| 4,169,044 A | 9/1979 | Crowley | |
| 4,223,728 A * | 9/1980 | Pegg | 166/266 |
| 4,228,853 A | 10/1980 | Harvey et al. | |
| 4,228,854 A | 10/1980 | Sacuta | |
| 4,260,019 A | 4/1981 | Blair, Jr. | |
| 4,280,559 A | 7/1981 | Best | |
| 4,344,485 A | 8/1982 | Butler | |
| 4,362,213 A | 12/1982 | Tabor | |
| 4,412,585 A | 11/1983 | Bouck | |
| 4,424,866 A | 1/1984 | McGuire | |
| 4,444,261 A | 4/1984 | Islip | |
| 4,450,909 A | 5/1984 | Sacuta | |
| 4,456,065 A | 6/1984 | Heim et al. | |
| 4,459,142 A * | 7/1984 | Goddin, Jr. | 62/635 |
| 4,476,928 A | 10/1984 | Green | |
| 4,489,782 A | 12/1984 | Perkins | |
| 4,495,995 A | 1/1985 | Chen et al. | |
| 4,510,997 A | 4/1985 | Fitch et al. | |
| 4,513,819 A | 4/1985 | Islip et al. | |
| 4,540,050 A | 9/1985 | Huang et al. | |
| 4,617,993 A | 10/1986 | Brown | |
| 4,627,495 A | 12/1986 | Harris et al. | |
| 4,676,889 A | 6/1987 | Hsieh et al. | |
| 4,678,036 A | 7/1987 | Hartman et al. | |
| 4,687,058 A | 8/1987 | Casad et al. | |
| 4,706,752 A | 11/1987 | Holm | |
| 4,819,724 A | 4/1989 | Bou-Mikael et al. | |
| 4,856,588 A | 8/1989 | Borchardt | |
| 4,921,576 A | 5/1990 | Hurd | |
| 4,969,130 A | 11/1990 | Wason et al. | |
| 5,025,863 A | 6/1991 | Haines et al. | |
| 5,027,898 A | 7/1991 | Naae | |
| 5,052,487 A | 10/1991 | Wall | |
| 5,060,727 A | 10/1991 | Schramm et al. | |
| 5,095,984 A | 3/1992 | Irani | |
| 5,105,884 A | 4/1992 | Sydansk | |
| 5,129,457 A | 7/1992 | Sydansk | |
| 5,167,280 A | 12/1992 | Sanchez et al. | |
| 5,174,377 A | 12/1992 | Kumar | |
| 5,236,577 A | 8/1993 | Tipman et al. | |
| 5,246,071 A | 9/1993 | Chu | |
| 5,350,014 A | 9/1994 | McKay | |
| 5,358,046 A | 10/1994 | Sydansk et al. | |
| 5,386,875 A | 2/1995 | Venditto et al. | |
| 5,400,030 A | 3/1995 | Duren et al. | |
| 5,407,009 A | 4/1995 | Butler et al. | |
| 5,607,016 A | 3/1997 | Butler | |
| 5,674,816 A | 10/1997 | Loree | |
| 5,720,350 A | 2/1998 | McGuire | |
| 5,725,054 A | 3/1998 | Shayegi et al. | |
| 5,771,973 A | 6/1998 | Jensen et al. | |
| 5,826,656 A | 10/1998 | McGuire et al. | |
| 5,855,243 A | 1/1999 | Bragg | |
| 5,876,592 A | 3/1999 | Tipman et al. | |
| 5,899,274 A | 5/1999 | Frauenfeld et al. | |
| 5,910,467 A | 6/1999 | Bragg | |
| 5,927,404 A | 7/1999 | Bragg | |
| 5,968,349 A | 10/1999 | Duyvesteyn et al. | |
| 6,007,709 A | 12/1999 | Duyvesteyn et al. | |
| 6,039,116 A | 3/2000 | Stevenson et al. | |
| 6,068,054 A | 5/2000 | Bragg | |
| 6,074,558 A | 6/2000 | Tachibana et al. | |
| 6,174,431 B1 | 1/2001 | Williams et al. | |
| 6,214,175 B1 | 4/2001 | Heinemann et al. | |
| 6,214,213 B1 | 4/2001 | Tipman et al. | |
| 6,244,341 B1 | 6/2001 | Miller | |
| 6,318,464 B1 | 11/2001 | Mokrys | |
| 6,357,526 B1 | 3/2002 | Abdel-Halim et al. | |
| 6,358,403 B1 | 3/2002 | Brown et al. | |
| 6,358,404 B1 | 3/2002 | Brown et al. | |
| 6,405,799 B1 | 6/2002 | Vallejos et al. | |
| 6,484,805 B1 | 11/2002 | Perkins | |
| 6,591,908 B2 | 7/2003 | Nasr | |
| 6,662,872 B2 | 12/2003 | Gutek et al. | |
| 6,708,759 B2 | 3/2004 | Leaute et al. | |
| 6,712,215 B2 | 3/2004 | Scheybeler | |
| 6,769,486 B2 | 8/2004 | Lim et al. | |
| 6,782,946 B2 | 8/2004 | Perkins et al. | |
| 6,800,116 B2 | 10/2004 | Stevens et al. | |
| 6,882,607 B2 | 4/2005 | Sano et al. | |
| 6,883,607 B2 | 4/2005 | Nenniger et al. | |
| 7,067,811 B2 | 6/2006 | Long et al. | |
| 7,073,837 B2 | 7/2006 | Madlinger | |
| 7,096,092 B1 | 8/2006 | Ramakrishnan et al. | |
| 7,141,162 B2 | 11/2006 | Garner et al. | |
| 7,165,616 B2 | 1/2007 | Jorgensen | |
| 7,165,621 B2 | 1/2007 | Ayoub et al. | |
| 7,234,524 B2 | 6/2007 | Shaw et al. | |
| 7,248,969 B2 | 7/2007 | Patzek et al. | |
| 7,259,688 B2 | 8/2007 | Hirsch et al. | |
| 7,272,973 B2 | 9/2007 | Craig | |
| 7,289,942 B2 | 10/2007 | Yang et al. | |
| 7,294,156 B2 * | 11/2007 | Chakrabarty et al. | 44/301 |
| 7,303,018 B2 | 12/2007 | Cawiezel et al. | |
| 7,363,973 B2 | 4/2008 | Nenniger et al. | |
| 7,418,307 B2 | 8/2008 | Katircioglu | |
| 7,434,619 B2 | 10/2008 | Rossi et al. | |
| 7,451,066 B2 | 11/2008 | Edwards et al. | |
| 7,464,756 B2 | 12/2008 | Gates et al. | |
| 7,465,389 B2 | 12/2008 | Sirota et al. | |
| 7,478,024 B2 | 1/2009 | Gurpinar et al. | |
| 7,527,096 B2 | 5/2009 | Chung et al. | |
| 7,540,951 B2 | 6/2009 | Selmen et al. | |
| 7,546,228 B2 | 6/2009 | Cullick et al. | |
| 7,585,407 B2 | 9/2009 | Duyvesteyn et al. | |
| 7,711,486 B2 | 5/2010 | Thigpen et al. | |
| 7,769,486 B2 | 8/2010 | McHenry et al. | |
| 8,118,096 B2 | 2/2012 | Ayasse | |
| 2002/0007947 A1 | 1/2002 | Patel et al. | |
| 2003/0015321 A1 | 1/2003 | Lim et al. | |
| 2003/0141053 A1 | 7/2003 | Yuan et al. | |
| 2004/0149431 A1 | 8/2004 | Wylie et al. | |
| 2005/0150844 A1 | 7/2005 | Hyndman et al. | |
| 2005/0263437 A1 | 12/2005 | Howdeshell | |
| 2006/0113218 A1 | 6/2006 | Hart et al. | |
| 2006/0115221 A1 | 6/2006 | Chalifoux et al. | |
| 2006/0138036 A1 | 6/2006 | Garner et al. | |
| 2006/0138055 A1 | 6/2006 | Garner et al. | |
| 2006/0162922 A1 | 7/2006 | Chung et al. | |
| 2006/0260980 A1 | 11/2006 | Yeung | |
| 2006/0289157 A1 | 12/2006 | Rao | |
| 2007/0106545 A1 | 5/2007 | Jowers et al. | |
| 2007/0108098 A1 * | 5/2007 | Flint et al. | 208/22 |

(56) References Cited

U.S. PATENT DOCUMENTS

| | | | |
|---|---|---|---|
| 2007/0111903 A1 | 5/2007 | Engel et al. | |
| 2007/0122104 A1 | 5/2007 | Chalifoux et al. | |
| 2007/0179766 A1 | 8/2007 | Cullick et al. | |
| 2007/0187090 A1 | 8/2007 | Shahbazi | |
| 2007/0199710 A1 | 8/2007 | Hocking | |
| 2008/0126168 A1 | 5/2008 | Carney et al. | |
| 2008/0167511 A1* | 7/2008 | Prim | 585/802 |
| 2008/0262736 A1 | 10/2008 | Thigpen et al. | |
| 2008/0262737 A1 | 10/2008 | Thigpen et al. | |
| 2008/0275796 A1 | 11/2008 | Katircioglu | |
| 2008/0277113 A1 | 11/2008 | Stegemeier et al. | |
| 2008/0294484 A1 | 11/2008 | Furman et al. | |
| 2009/0008290 A1* | 1/2009 | Biswas et al. | 208/57 |
| 2009/0145606 A1 | 6/2009 | Hocking | |
| 2009/0159277 A1 | 6/2009 | Hocking | |
| 2009/0194282 A1 | 8/2009 | Beer et al. | |
| 2009/0242463 A1 | 10/2009 | Chirinos et al. | |
| 2010/0006285 A1 | 1/2010 | DaSilva et al. | |
| 2010/0032348 A1 | 2/2010 | Duyvesteyn et al. | |
| 2010/0147516 A1 | 6/2010 | Betzer-Zilevitch | |
| 2010/0155062 A1* | 6/2010 | Boone et al. | 166/272.3 |
| 2010/0218954 A1 | 9/2010 | Yale et al. | |
| 2010/0276341 A1 | 11/2010 | Speirs et al. | |
| 2011/0120717 A1 | 5/2011 | LaMont et al. | |
| 2011/0198086 A1 | 8/2011 | Kwan et al. | |
| 2011/0198091 A1 | 8/2011 | Sirota et al. | |
| 2011/0224907 A1 | 9/2011 | Chalifoux | |
| 2011/0226471 A1 | 9/2011 | Wattenbarger et al. | |
| 2011/0264373 A1 | 10/2011 | Hehmeyer et al. | |

FOREIGN PATENT DOCUMENTS

| | | |
|---|---|---|
| CA | 1059432 | 7/1979 |
| CA | 1122115 | 4/1982 |
| CA | 1246993 | 12/1988 |
| CA | 2043092 | 11/1992 |
| CA | 2058812 | 7/1993 |
| CA | 2108723 | 10/1993 |
| CA | 2108349 | 11/1993 |
| CA | 2075108 | 1/1994 |
| CA | 2120851 | 8/1995 |
| CA | 2232403 | 2/1998 |
| CA | 2185837 | 3/1998 |
| CA | 2200899 | 9/1998 |
| CA | 2232929 | 9/1998 |
| CA | 2270703 | 10/2000 |
| CA | 2312621 | 12/2000 |
| CA | 2243105 | 11/2001 |
| CA | 2141112 | 11/2002 |
| CA | 2349234 | 11/2002 |
| CA | 2353109 | 1/2003 |
| CA | 2310959 | 1/2004 |
| CA | 2471048 | 3/2004 |
| CA | 2527058 | 3/2004 |
| CA | 2505411 | 7/2004 |
| CA | 2425840 | 10/2004 |
| CA | 2306016 | 11/2004 |
| CA | 2349234 | 12/2004 |
| CA | 2435113 | 1/2005 |
| CA | 2493677 | 6/2005 |
| CA | 2455011 | 7/2005 |
| CA | 2462359 | 9/2005 |
| CA | 2520943 | 4/2006 |
| CA | 2490734 | 6/2006 |
| CA | 2494391 | 7/2006 |
| CA | 2502329 | 9/2006 |
| CA | 2538464 | 9/2006 |
| CA | 2147079 | 10/2006 |
| CA | 2235085 | 1/2007 |
| CA | 2281276 | 2/2007 |
| CA | 2521248 | 3/2007 |
| CA | 2587166 | 9/2007 |
| CA | 2552482 | 1/2008 |
| CA | 2630682 | 6/2008 |
| CA | 2351148 | 7/2008 |
| CA | 2304938 | 12/2008 |
| CA | 2591354 | 12/2008 |
| CA | 2332685 | 3/2010 |
| CA | 2688392 | 6/2011 |
| CA | 2724806 | 6/2011 |
| EP | 1355169 | 10/2003 |
| EP | 2022936 | 2/2009 |
| RU | 1723314 | 3/1992 |
| WO | WO 99/33936 | 8/1999 |
| WO | WO 2006/044199 | 4/2006 |
| WO | WO 2008/009114 | 1/2008 |
| WO | WO 2008/070990 | 6/2008 |
| WO | WO 2009/014586 | 1/2009 |
| WO | WO 2009/061433 | 5/2009 |
| WO | WO 2009/067423 | 5/2009 |
| WO | WO 2009/075962 | 6/2009 |
| WO | WO 2010/039029 | 4/2010 |

OTHER PUBLICATIONS

Feali, M. et al., (2008) "Feasibility Study of the Cyclic VAPEX Process for Low Permeable Carbonate Systems", International Petroleum Technology Conference Paper 12833; Dec. 3-5, Kuala Lumpur, Malaysia.

Lim, G.B. et al., (1995) "Cyclic Stimulation of Cold Lake Oil Sand with Supercritical Ethane", SPE Paper 30298, SPE International Heavy Oil Symposium; Jun. 19-21, Calgary, Alberta, Canada.

Lim, G.B., et al., (1996) "Three-dimensional Scaled Physical Modeling of Solvent Vapour Extraction of Cold Lake Bitumen", *The Journal of Canadian Petroleum Technology*, 35(4), pp. 32-40, Apr. 1996; SPE/CIM/CANMET International Conference on Recent Advances in Horizontal Well Applications, Mar. 20-23, Calgary, Canada.

ASTM D 2887 (1997).

Azin et al. (2007) "Investigation of the Vapex Performance in High Pressure Heavy Oil Reservoirs".

Black, L. (2003) "VAPEX—A New Propane Market," *Propane Canada* May/Jun. 2003, http://findarticles.com/p/articles/mi_qa5410/is_200305/ai_n21332180/.

Budd, G. (2007) "New Technology Could Substantially Boost SAGD Potential," *Oil Sands Review*.

Butler, R. M. et al. (1991) "A New Process (VAPEX) for Recovering Heavy Oils Using Hot Water and Hydrocarbon Vapour," *Jrnl. of Canadian Petroleum Tech.*, v. 30, pp. 97-106.

Butler, R. M. et al. (1993) "Recovery of Heavy Oils Using Vapourized Hydrocarbon Solvents: Further Development of the Vapex Process," *Journal of Canadian Petroleum Technology*, June, v. 32, No. 6, pp. 56-62.

Cuthiell, D. et al. (2003) "Investigation of the VAPEX Process Using CT Scanning and Numerical Simulation," *Jrnl. of Canadian Petroleum Tech.*, v. 42.2, pp. 41-49.

Cuthiell, D. et al. (2006) "Viscous Fingering Effects in Solvent Displacement of Heavy Oil," *Jrnl. of Canadian Petroleum Tech.*, v. 45.7, pp. 29-39.

Gallant, R. J. et al. (1993) "Steaming and Operating Strategies at a Midlife CSS Operation," *SPE* 25794, pp. 183-194.

Gupta, S. et al. (2001) "Insights into Some Key Issues with Solvent Aided Process," *Petroleum Society-Canadian Institute of Mining, Metallurgy & Petroleum*, Paper No. 2001-126.

Katz et al. (1959) "Handbook of Natural Gas Engineering," *McGraw-Hill*, p. 212.

Nasr, T. N. et al. (1991) "A Novel Scaled Physical Simulator for Horizontal Well Enhanced Oil Recovery," *Petroleum Society of CIM and CANMET*, Paper No. 5.

Rostami, B. et al. (2005) "Investigation of the Vapex Process in High-Pressure Fractured Heavy-Oil Reservoirs," *SPE* 97766, Alberta, Canada.

Sloan, Jr., E. D. (1998) "Clathrate Hydrate of Natural Gases," $2^{nd}$ ed. *Marcel Dekker, Inc.* New York, pp. 162, 170, 200-201, 269, 520.

(56) References Cited

OTHER PUBLICATIONS

Turta, A. T. et al. (2004) "Overview of Short-Distance Oil Displacement Processes," *Jrnl. of Canadian Petroleum Tech.*, v. 43, pp. 29-38.
Upreti, S. R. et al. (2007) "Vapor Extraction of Heavy Oil and Bitumen: A Review," *Energy & Fuels*, v. 21, pp. 1562-1574.
Vagnetti, R. et al. (2009) "Solvent Based Oil Recovery for In-Situ Upgrading of Heavy Oil," www.netl.doe.gov/technologies/oil-gas/Petroleum/projects/EP/ImprovedRec/42745SolventEOR.html.
Vogel, J. V. (1996) "How Solvent Vapors Can Improve Steam Floods," *World Oil*, Nov. 1996, pp. 75-77.

* cited by examiner

SOLVENT SEPARATION IN A SOLVENT-DOMINATED RECOVERY PROCESS

CROSS-REFERENCE TO RELATED APPLICATION

This application claims priority from Canadian Patent Application 2,693,640 filed Feb. 17, 2010 entitled SOLVENT SEPARATION IN A SOLVENT-DOMINATED RECOVERY PROCESS, the entirety of which is incorporated by reference herein.

FIELD OF THE INVENTION

The present invention is in the field of In situ hydrocarbon recovery. More particularly, the present invention relates to solvent separation in a solvent-dominated recovery process.

BACKGROUND OF THE INVENTION

At the present time, solvent-dominated recovery processes (SDRPs) are rarely used to produce highly viscous oil. Highly viscous oils are produced primarily using thermal methods in which heat, typically in the form of steam, is added to the reservoir. Cyclic solvent-dominated recovery processes (CS-DRPs) are a subset of SDRPs. A CSDRP is typically, but not necessarily, a non-thermal recovery method that uses a solvent to mobilize viscous oil by cycles of injection and production. Solvent-dominated means that the injectant comprises greater than 50% by mass of solvent or that greater than 50% of the produced oil's viscosity reduction is obtained by chemical solvation rather than by thermal means. One possible laboratory method for roughly comparing the relative contribution of heat and dilution to the viscosity reduction obtained in a proposed oil recovery process is to compare the viscosity obtained by diluting an oil sample with a solvent to the viscosity reduction obtained by heating the sample.

In a CSDRP, a viscosity-reducing solvent is injected through a well into a subterranean viscous-oil reservoir, causing the pressure to increase. Next, the pressure is lowered and reduced-viscosity oil is produced to the surface through the same well through which the solvent was injected. Multiple cycles of injection and production are used. In some instances, a well may not undergo cycles of injection and production, but only cycles of injection or only cycles of production.

CSDRPs may be particularly attractive for thinner or lower-oil-saturation reservoirs. In such reservoirs, thermal methods utilizing heat to reduce viscous oil viscosity may be inefficient due to excessive heat loss to the overburden and/or underburden and/or reservoir with low oil content.

References describing specific CSDRPs include: Canadian Patent No. 2,349,234 (Lim et al.); G. B. Lim et al., "Three-dimensional Scaled Physical Modeling of Solvent Vapour Extraction of Cold Lake Bitumen", The Journal of Canadian Petroleum Technology, 35(4), pp. 32-40, April 1996; G. B. Lim et al., "Cyclic Stimulation of Cold Lake Oil Sand with Supercritical Ethane", SPE Paper 30298, 1995; U.S. Pat. No. 3,954,141 (Allen et al.); and M. Feali et al., "Feasibility Study of the Cyclic VAPEX Process for Low Permeable Carbonate Systems", International Petroleum Technology Conference Paper 12833, 2008.

The family of processes within the Lim et al. references describe embodiments of a particular SDRP that is also a cyclic solvent-dominated recovery process (CSDRP). These processes relate to the recovery of heavy oil and bitumen from subterranean reservoirs using cyclic injection of a solvent in the liquid state which vaporizes upon production. The family of processes within the Lim et al. references may be referred to as CSP™ processes.

Solvent-dominated recovery processes (SDRP)s may involve the addition of hydrocarbon solvents (such as propane) to an underground oil reservoir, including a reservoir of viscous oil such as bitumen, to mix with and lower the viscosity of the bitumen, and allow it to be produced. The hydrocarbon portion of the produced mixture includes the solvent and produced oil, in a vapor phase and one or more liquid phases. Depending on the particular pressure and composition, the liquid portion can be in two liquid phases. Previously described SDRPs, such as CSP™ technology, an example of which is described in Canadian Patent No. 2,349,234, involve flashing the solvent in the entire produced mixture, leaving a single produced oil phase. The solvent may then be re-injected into the reservoir.

Whereas in such SDRPs, the solvent is present in the oil stream, in certain instances outside the field of In situ oil recovery, oils are refined through the addition of a solvent, which solvent is then removed from the refined oil. Solvent deasphalting in a refinery environment is known. For instance, U.S. Pat. No. 4,125,458 describes a process to simultaneously deasphalt-extract a mineral oil feedstock comprising both asphaltene and aromatic components. Suitable feedstocks are said to include whole crude oils, atmospheric and vacuum residua, and mixtures thereof having initial boiling points ranging from 500 to 1,100° F. at atmospheric pressure. The feed is contacted with a deasphalting-extraction solvent in one or more mixer-settler units or in one or more countercurrent liquid-liquid converting towers. The solvent is then flashed off from the mixture.

The following four references also relate to the use of solvent to purify an oil feed. U.S. Pat. No. 6,174,431 relates generally to the recovery and regeneration of used lubricant and industrial oils and more specifically to the treatment and refinement of used lubricants and industrial oils to produce re-refined base oil and to remove additives and impurities from used oils and lubricants. A pre-treated used oil may be combined with liquid propane and an extraction vessel and a settling vessel may be used to produce a heavy fraction and a light fraction. The propane may be removed independently from each of these fractions.

U.S. Pat. No. 4,169,044 describes a process for re-refining used lubricating oil. The used lubricating oil is subjected to a solvent extraction in a first extraction zone with a light hydrocarbon solvent to separate a solvent-rich extract oil fraction from a solvent-lean bottoms fraction. Substantially purified lube oil is recovered from the solvent-rich extract oil fraction. The solvent-lean bottoms fraction is subjected to a solvent extraction in a second extraction zone with the light hydrocarbon solvent at a higher solvent-to-oil liquid volume ratio than that of the first solvent extraction to thereby separate a second solvent-rich extract oil fraction from a second solvent-lean bottoms fraction. The substantially purified heavy oil from the second solvent-rich extract oil fraction is recovered. Finally, all remaining solvent from the solids in the second solvent-lean bottoms fraction is removed.

In the field of In situ oil recovery, U.S. Pat. No. 4,476,928 relates to the tertiary recovery of subterranean hydrocarbons using a solvent, and more particularly to a method and apparatus for the generation of a solvent by the recovery of ethers and other light ends from a liquid mixture of organic compounds recovered from the subterranean deposits. Ambient air is bubbled through liquid hydrocarbons in a storage tank to evaporate or boil off light ends which may be used as solvent for injection into the subterranean oil field or coal deposit. The solvent may be used to provide a gas drive or as an extraction solvent for the recovery of crude oil.

U.S. Patent Application Publication No. US 2009/0242463 relates to a continuous process for upgrading a heavy hydrocarbon. The heavy hydrocarbon is heated and contacted with a solvent to form a first product comprising a mixture of upgraded hydrocarbons and solvent, and a second product comprising asphaltene waste and water. Solvent is recovered from each of the first and second products.

Mixing solvent with viscous oil may be used in the recovery of the oil from subterranean reservoirs, pipelining the oil to refineries, and in upgrading the oil at refineries. Adding solvent to oil can reduce its viscosity and thus facilitate production and pipelining. Adding certain solvents may also cause low value asphaltic components to precipitate and thus facilitate their separation thus generating an upgraded oil which can simplify later refining. There is a need for an improved method for recovering solvent from fluids produced in solvent-dominated recovery processes so as to optimize the entire production-pipelining-refining chain.

SUMMARY OF THE INVENTION

It is an object of the present invention to obviate or mitigate at least one disadvantage of previous processes.

In solvent dominated recovery processes (SDRP)s for recovering in situ oil, including bitumen, the produced fluid stream includes oil and solvent. The solvent is preferably recovered and re-injected into the reservoir. In previously described methods, solvent is removed from the oil/solvent mixture. In methods of embodiments of the present invention, the oil/solvent mixture is first separated into a heavier stream and a lighter stream from which solvent is independently removed.

In a first aspect, the present invention provides a method of producing hydrocarbons from an underground reservoir, the method comprising: (a) injecting a viscosity-reducing solvent into the reservoir; (b) producing a fluid stream from the reservoir comprising one or two liquid hydrocarbon phases; (c) optionally combining the fluid stream with additional solvent such that the number of liquid hydrocarbon phases is increased from one to two; (d) at least partially separating the two liquid hydrocarbon phases into a lighter stream and a heavier stream; (e) at least partially recovering injected solvent from each of the two separated streams to form a lighter solvent-stripped liquid stream and a heavier solvent-stripped liquid stream; and (f) re-injecting at least a portion of the solvent recovered from one or both of the lighter and heavier streams, into the reservoir.

In certain embodiments, the following features may be present.

The fluid stream of step (b) may comprise two liquid hydrocarbon phases.

The viscosity-reducing solvent may be injected as part of a fluid, the fluid comprising greater than 50 mass % of the viscosity-reducing solvent. Immediately after halting injection of the viscosity-reducing solvent into the reservoir, at least 25 mass % of the injected solvent may be in a liquid state in the reservoir. The injected fluid may comprise greater than 75 mass % of the viscosity-reducing solvent.

At least 25 mass %, or at least 50 mass %, of the solvent may enter the reservoir as a liquid.

The solvent may comprise greater than 50 mass % of a $C_2$-$C_5$ paraffinic hydrocarbon solvent. The solvent may comprise greater than 50 mass % propane. The solvent comprises greater than 70 mass % propane. The solvent may comprise greater than 20 mass % ethane. The solvent may comprises $CO_2$.

The phases may be at least partially separated by gravity settling.

The phases may be at least partially separated by applying centrifugal forces.

The solvent may be separated from a stream by lowering a pressure on the stream.

The solvent separation may be effected in a continuous manner, with the feed injected in a separation vessel and the lighter and heavier streams removed from a top and bottom of the separation vessel, respectively.

The heavier solvent-stripped stream may have a MicroCarbon Residue of more than double the MicroCarbon Residue of the lighter solvent-stripped stream.

The heavier solvent-stripped stream may have a density at least 5% greater than a density of the lighter solvent-stripped stream at 25° C. and atmospheric pressure.

The lighter solvent-stripped stream may have a viscosity at 25° C. of at least an order of magnitude less than the heavier solvent-stripped stream.

The method may further comprise pipelining, without adding diluent, the lighter solvent-stripped stream.

The method may further comprise adding diluent to the heavier solvent-stripped stream and then pipelining the resultant stream.

The method may further comprise transporting the lighter and heavier solvent-stripped streams to different locations.

The method may further comprise transporting the lighter and heavier solvent-stripped streams in block operation in a single pipeline.

The method may further comprise using the heavier solvent-stripped stream in the vicinity of the solvent separation, without pipelining. This method may further comprise combusting the heavier solvent-stripped stream to provide power and heat for local oil production or upgrading operations. This method may further comprise combusting the heavier solvent-stripped stream to provide heat for a thermal viscous oil recovery process.

The method may further comprise sending the heavier solvent-stripped stream to an upgrader.

The method may further comprise sending the lighter solvent-stripped stream to a coker.

The method may further comprise using the heavier solvent-stripped stream in asphalt.

The hydrocarbons may be a viscous oil having an in situ viscosity of at least 10 cP (centipoise) at initial reservoir conditions.

The method of producing hydrocarbons may be a cyclic solvent-dominated recovery process. The cyclic solvent-dominated oil recovery process may comprise: (a) injecting the fluid comprising greater than 50 mass % of the viscosity-reducing solvent into an injection well completed in the reservoir; (b) halting injection into the injection well and subsequently producing at least a fraction of the injected fluid and the hydrocarbons from the reservoir through a production well; (c) halting production through the production well; and (d) subsequently repeating the cycle of steps (a) to (c). The injection well and the production well may utilize a common wellbore.

The method may further comprise evaluating a quality of the fluid stream from the reservoir, where, if the quality is above a first quality threshold, at least partially separating solvent therefrom with the lighter stream, without separating it into lighter and heavier streams; where, if the quality is below a second quality threshold, at least partially separating solvent therefrom with the heavier stream, without separating it into lighter and heavier streams; and where, if the quality is between the first and second quality thresholds, proceeding with the step of at least partially separating the two liquid phases into a lighter stream and a heavier stream prior to solvent separation.

Step (f) may comprise re-injecting at least a portion of the solvent recovered from the lighter stream, and at least a portion of the solvent recovered from the heavier stream, into the reservoir.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
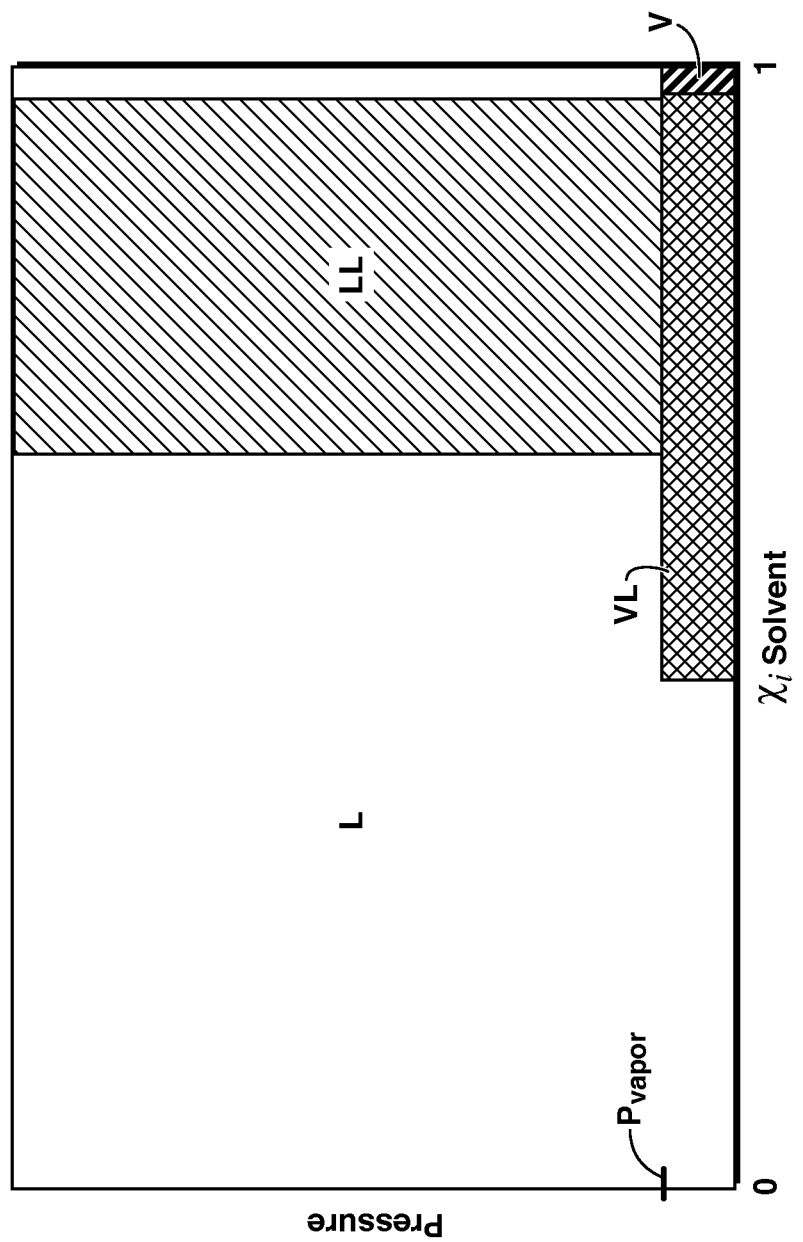
FIG. 1 is a conceptual diagram showing the phases of a solvent-bitumen mixture depending on the pressure and solvent mole fraction.

The term "viscous oil", as used herein, means a hydrocarbon, or mixture of hydrocarbons, that occurs naturally and that has a viscosity of at least 10 cP (centipoise) at initial reservoir conditions. Viscous oil includes oils generally defined as "heavy oil" or "bitumen". Bitumen is classified as an extra heavy oil, with an API gravity of about 10° or less, referring to its gravity as measured in degrees on the American Petroleum Institute (API) Scale. Heavy oil has an API gravity in the range of about 22.3° to about 10°. The terms viscous oil, heavy oil, and bitumen are used interchangeably herein since they may be extracted using similar processes.

In situ is a Latin phrase for "in the place" and, in the context of hydrocarbon recovery, refers generally to a subsurface hydrocarbon-bearing reservoir. For example, In situ temperature means the temperature within the reservoir. In another usage, an In situ oil recovery technique is one that recovers oil from a reservoir within the earth.

The term "formation" as used herein refers to a subterranean body of rock that is distinct and continuous. The terms "reservoir" and "formation" may be used interchangeably.

During a CSDRP, a reservoir accommodates the injected solvent and non-solvent fluid by compressing the pore fluids and, more importantly in some embodiments, by dilating the reservoir pore space when sufficient injection pressure is applied. Pore dilation is a particularly effective mechanism for permitting solvent to enter into reservoirs filled with viscous oils when the reservoir comprises largely unconsolidated sand grains. Injected solvent fingers into the oil sands and mixes with the viscous oil to yield a reduced viscosity mixture with significantly higher mobility than the native viscous oil. Without intending to be bound by theory, the primary mixing mechanism is thought to be dispersive mixing, not diffusion. Preferably, injected fluid in each cycle replaces the volume of previously recovered fluid and then adds sufficient additional fluid to contact previously uncontacted viscous oil. Preferably, the injected fluid comprises greater than 50% by mass of solvent.

On production, the pressure is reduced and the solvent(s), non-solvent injectant, and viscous oil flow back to the same well and are produced to the surface. As the pressure in the reservoir falls, the produced fluid rate declines with time. Production of the solvent/viscous oil mixture and other injectants may be governed by any of the following mechanisms: gas drive via solvent vaporization and native gas exsolution, compaction drive as the reservoir dilation relaxes, fluid expansion, and gravity-driven flow. The relative importance of the mechanisms depends on static properties such as solvent properties, native GOR (Gas to Oil Ratio), fluid and rock compressibility characteristics, and reservoir depth, but also depends on operational practices such as solvent injection volume, producing pressure, and viscous oil recovery to-date, among other factors.

During an injection/production cycle, the volume of produced oil should be above a minimum threshold to economically justify continuing operations. In addition to an acceptably high production rate, the oil should also be recovered in an efficient manner. One measure of the efficiency of a CSDRP is the ratio of produced oil volume to injected solvent volume over a time interval, called the OISR (produced Oil to Injected Solvent Ratio). Typically, the time interval is one complete injection/production cycle. Alternatively, the time interval may be from the beginning of first injection to the present or some other time interval. When the ratio falls below a certain threshold, further solvent injection may become uneconomic, indicating the solvent should be injected into a different well operating at a higher OISR. The exact OISR threshold depends on the relative price of viscous oil and solvent, among other factors. If either the oil production rate or the OISR becomes too low, the CSDRP may be discontinued. Even if oil rates are high and the solvent use is efficient, it is also important to recover as much of the injected solvent as possible if it has economic value. The remaining solvent may be recovered by producing to a low pressure to vaporize the solvent in the reservoir to aid its recovery. One measure of solvent recovery is the percentage of solvent recovered divided by the total injected. In addition, rather than abandoning the well, another recovery process may be initiated. To maximize the economic return of a producing oil well, it is desirable to maintain an economic oil production rate and OISR as long as possible and then recover as much of the solvent as possible.

The OISR is one measure of solvent efficiency. Those skilled in the art will recognize that there are a multitude of other measures of solvent efficiency, such as the inverse of the OISR, or measures of solvent efficiency on a temporal basis that is different from the temporal basis discussed in this disclosure. Solvent recovery percentage is just one measure of solvent recovery. Those skilled in the art will recognize that there are many other measures of solvent recovery, such as the percentage loss, volume of unrecovered solvent per volume of recovered oil, or its inverse, the volume of produced oil to volume of lost solvent ratio (OLSR).

Solvent Composition

The solvent may be a light, but condensable, hydrocarbon or mixture of hydrocarbons comprising ethane, propane, or butane. Additional injectants may include $CO_2$, natural gas, $C_{3+}$ hydrocarbons, ketones, and alcohols. Non-solvent co-injectants may include steam, hot water, or hydrate inhibitors. Viscosifiers may be useful in adjusting solvent viscosity to reach desired injection pressures at available pump rates and may include diesel, viscous oil, bitumen, or diluent. Viscosifiers may also act as solvents and therefore may provide flow assurance near the wellbore and in the surface facilities in the event of asphaltene precipitation or solvent vaporization during shut-in periods. Carbon dioxide or hydrocarbon mixtures comprising carbon dioxide may also be desirable to use as a solvent.

In one embodiment, the solvent comprises greater than 50% $C_2$-$C_5$ hydrocarbons on a mass basis. In one embodiment, the solvent is primarily propane, optionally with diluent when it is desirable to adjust the properties of the injectant to improve performance. Alternatively, wells may be subjected to compositions other than these main solvents to improve well pattern performance, for example $CO_2$ flooding of a mature operation.

Phase of Injected Solvent

In one embodiment, the solvent is injected into the well at a pressure in the underground reservoir above a liquid/vapor phase change pressure such that at least 25 mass % of the solvent enters the reservoir in the liquid phase. Alternatively, at least 50, 70, or even 90 mass % of the solvent may enter the reservoir in the liquid phase. Injection as a liquid may be preferred for achieving high pressures because pore dilation at high pressures is thought to be a particularly effective mechanism for permitting solvent to enter into reservoirs filled with viscous oils when the reservoir comprises largely unconsolidated sand grains. Injection as a liquid also may allow higher overall injection rates than injection as a gas.

In an alternative embodiment, the solvent volume is injected into the well at rates and pressures such that immediately after halting injection into the injection well, at least 25 mass % of the injected solvent is in a liquid state in the underground reservoir. Injection as a vapor may be preferred in order to enable more uniform solvent distribution along a horizontal well. Depending on the pressure of the reservoir, it may be desirable to significantly heat the solvent in order to inject it as a vapor. Heating of injected vapor or liquid solvent may enhance production through mechanisms described by "Boberg, T. C. and Lantz, R. B., "Calculation of the production of a thermally stimulated well", JPT, 1613-1623, December 1966. Towards the end of the injection cycle, a portion of the injected solvent, perhaps 25% or more, may become a liquid as pressure rises. Because no special effort is made to maintain the injection pressure at the saturation conditions of the solvent, liquefaction would occur through pressurization, not condensation. Downhole pressure gauges and/or reservoir simulation may be used to estimate the phase of the solvent and other co-injectants at downhole conditions and in the reservoir. A reservoir simulation is carried out using a reservoir simulator, a software program for mathematically modeling the phase and flow behavior of fluids in an underground reservoir. Those skilled in the art understand how to use a reservoir simulator to determine if 25% of the injectant would be in the liquid phase immediately after halting injection. Those skilled in the art may rely on measurements recorded using a downhole pressure gauge in order to increase the accuracy of a reservoir simulator. Alternatively, the downhole pressure gauge measurements may be used to directly make the determination without the use of reservoir simulation.

Although preferably a CSDRP is predominantly a nonthermal process in that heat is not used principally to reduce the viscosity of the viscous oil, the use of heat is not excluded. Heating may be beneficial to principally improve performance, improve process start-up or provide flow assurance during production. For start-up, low-level heating (for example, less than 100° C.) may be appropriate. Low-level heating of the solvent prior to injection may also be performed to prevent hydrate formation in tubulars and in the reservoir. Heating to higher temperatures may benefit recovery.

In a SDRP for bitumen, or other asphaltic oil, when the solvent primarily comprises aliphatic hydrocarbons, such as ethane, propane, butane, pentane, hexane, or heptane, the composition and pressure of the SDRP-produced fluid may be such that the solvent-bitumen mixture within the produced fluid is in a two-liquid phase state. Other solvents, such as carbon dioxide may also form a two-liquid phase mixture. Toluene, xylene, and cyclohexane are examples of solvents that would not form a two-liquid phase mixture. For example, in an embodiment using propane as the solvent, propane-bitumen mixtures exhibit two liquid phases when produced at some pressures above atmospheric pressure and at propane solvent mole concentrations bounded by about 0.7 and about 0.95. FIG. 1 illustrates a conceptual phase diagram of a propane-bitumen mixture. The vapor only (V), liquid only (L), vapor-liquid (VL), and liquid-liquid (LL) regions of the phase diagram are indicated. Within the liquid-liquid region, there exist two liquid hydrocarbon phases, one relatively richer in propane and the other relatively richer in bitumen. The fluid phase richer in solvent (propane, in this example) is termed the "lighter" phase. The fluid phase richer in bitumen is termed the "heavier" phase. To the extent that the SDRP recovers not only the lighter liquid phase, but all or some fraction of the heavier liquid phases, both of these phases will be expected to be present in the production stream. Depending on the solvent used, more than two phases could be produced. For instance, a heavy, middle, and light phase could be produced, especially if one was more prone to forming an emulsion with water, and each could be processed as discussed below. For ease of reference, the following discussion will refer to two liquid phases, which is to be understood to mean at least two phases. Additionally, an aqueous phase is also produced. Processing of the aqueous phase will not be discussed below. The heavier and lighter phases may comprise small or trace amounts of water.

Figure 2:
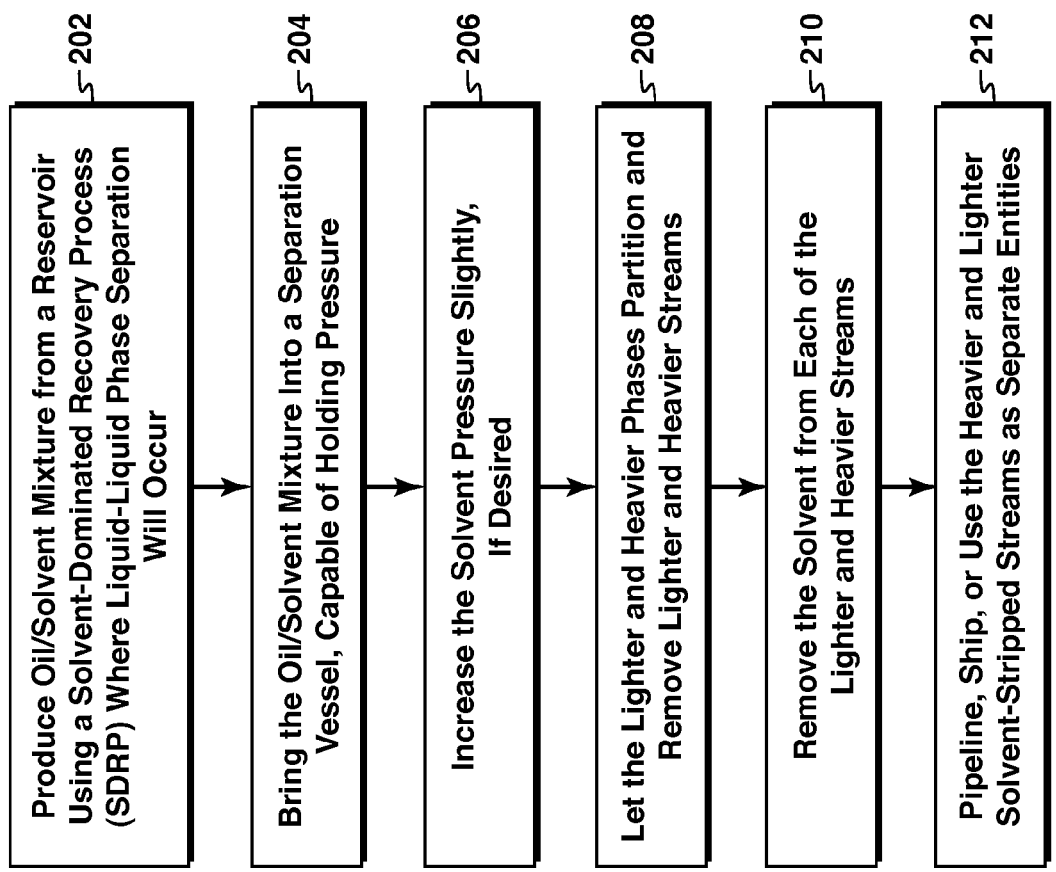
FIG. 2 is a flow chart illustrating steps of a method according to a disclosed embodiment.

Embodiments of the present invention relate to a method for separation in order to obtain heavier and lighter streams. FIG. 2 illustrates the steps of one embodiment where the produced fluid comprises two liquid hydrocarbon phases. In an SDRP, a bitumen/solvent mixture is produced from an underground oil reservoir (202). Liquid-liquid phase segregation occurs wherever the solvent mole fraction of the mixture is in the liquid-liquid regime of FIG. 1. The two-liquid phase bitumen/solvent mixture is introduced into a separation vessel capable of maintaining the pressure therein (204). The separation vessel preferably functions using gravity as the primary means of separation, although centrifugation or other means may be employed. The pressure of the solvent is optionally increased (206) to assist in the separation. The particular pressure of the vessel may be selected to control, to some degree, the mole fractions of solvent and bitumen in the separated streams. The lighter stream and the heavier stream separate from one another. The separation could be a batch process, but is more preferably a continuous separation with the two-liquid phase mixture added (preferably in the middle of a vertical vessel) and the two separate streams flowing out the top and bottom (208). Then, the solvent is flashed from the two streams independently to obtain two separate product streams (210). Flashing the solvent is preferably carried out by decreasing the pressure but may also be carried out by increasing the temperature. Other means may also include the use of a selective membrane. The lighter and heavier streams may be pipelined, shipped, or used separately (212).

The lighter solvent-stripped stream will have a lower density, lower MCR (MicroCarbon Residue, which is a marker for coke yield in a coker), lower (almost zero) asphaltene content, lower metals content (metals foul catalysts in future downstream processing), lower resid (non-distillable petroleum fraction) content and a lower viscosity, than a full solvent-stripped stream. These changes all have economic value. Furthermore, less solvent would be needed for pipelining. The heavier solvent-stripped stream would therefore have a higher asphaltene content and higher MCR. MCR may be determined using several methods, including standard testing methods defined in ASTM D 4530 and ISO 10370. With the lower value molecules thus concentrated in a stream separate from the higher value molecules, the process allows independent disposal of the low value stream, either on-site or off-site.

If off-site disposal of the heavier solvent-stripped stream is preferred, the two solvent-stripped products could be pipelined separately or in block operation in a single pipeline. At the terminus of the pipeline, the heavier stream may be used for asphalt manufacture, or sent to a coker or other upgrading process. Heavy ends may also be emulsified (or emulsion) and trucked off site as an alternative to pipelining.

Alternatively, the heaviest stream may be used on-site (locally), pipelining to an off-site location only the higher value material. Local methods of disposal for the heaviest stream include reinjection into a reservoir, use as fuel in a boiler for steam generation, and/or use as fuel in a power generation system. On-site disposal may be most applicable to extra heavy crudes such as Athabasca 8° API crudes where it is advantageous to reject about 5 to 10% of the very heaviest ends. Rejection of the heaviest ends reduces unwanted heavy metals and other molecules with little value to downstream refining processes. Rejection of the heaviest ends reduces the need for diluent and may increase overall value by rejecting molecules with negative value. Rejection of the heaviest ends may also be necessary to meet pipeline specifications for crude oil blends. Crude oil containing the heaviest ends may be too heavy to readily flow, and may need to be heated in order to be shipped to the point of disposal. Where thermal heavy oil recovery operations are taking place on-site, one disposal option is co-injection of the heavy ends with steam (WO/009014586 A1).

Figure 3:
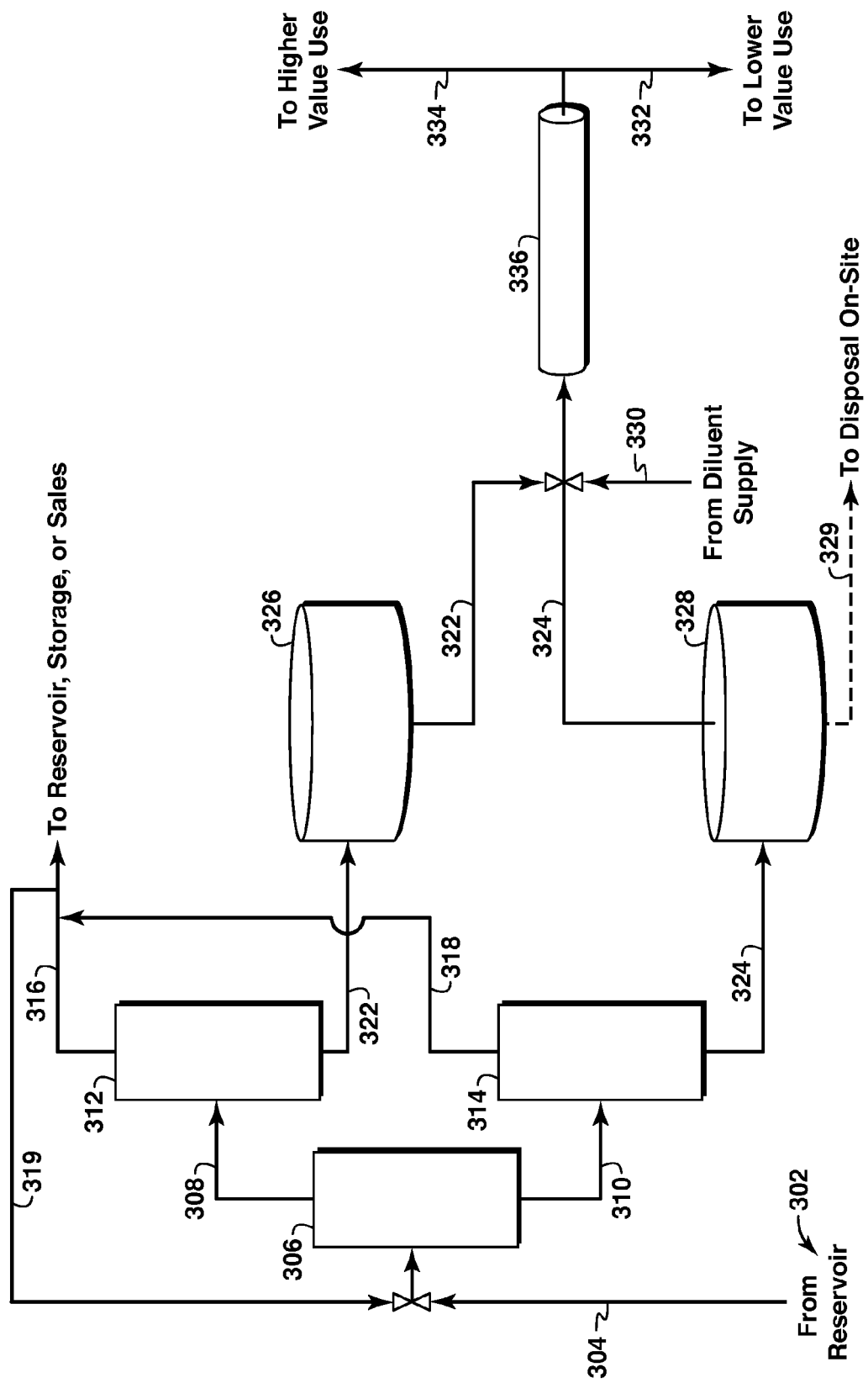
FIG. 3 is a schematic of a method according to a disclosed embodiment.

FIG. 3 shows a schematic of a process according to one embodiment where both solvent-stripped streams are pipelined to an off-site location. In an SDRP, from the reservoir (302), a solvent/bitumen mixture (304) is produced and is introduced into a separation vessel (306) to separate the solvent/bitumen mixture (304) into the lighter stream (308) and the heavier stream (310). Instead of the whole bitumen/solvent stream undergoing solvent flashing, there are two separate vessels for flashing the solvent from the lighter and heavier stream, independently. Thus, solvent is flashed off from the lighter stream (308) in flash vessel (312) and solvent is flashed off the heavier stream (310) in flash vessel (314). Solvent from these vessels (316 and 318) may be recycled (319) to a separation vessel, re-injected into a reservoir, stored, sold, or disposed of by a combination of these means. If the produced fluid (304) contains a single liquid hydrocarbon phase, the solvent recycle line (319) may increase the concentration of solvent such that the fluid enters the two-liquid hydrocarbon phase regime, crossing the boundary between the L and LL regions shown in FIG. 1. In FIG. 3, the solvent-stripped streams (322 and 324) are sent to holding tanks (326 and 328) and then pipelined. This schematic shows the two streams being pipelined in the same pipeline (336) with block operation. A dashed line (329) indicates an alternative process to pipelining, disposal on-site via reinjection or use as fuel. To assist in pipelining, diluent (330) may be added to the heavier stream (324). At the end of the pipeline, the heavier (332) and lighter (334) streams may be used separately.

The exact temperature and pressure ranges used in the process vessels (306, 312, and 314) are selected to be compatible with how the SDRP operates, and depend on the pressure-volume-temperature relationships of the exact solvent system. For example, a system that produces an unheated fluid would operate generally at low pressures, generally not more than a few hundred kPa. The specific pressure should, however, be in the range of where there are two liquid phases. The operating temperature would likely be ambient temperature. Many of the process vessels (306, 312, 314) employed are also common to solvent deasphalting processes carried out in a refinery. It may be advantageous to optimize the operations, including operational pressures and temperatures, of the process vessels with other, similar vessels located at a more distant refinery containing similar vessels.

Laboratory work has confirmed that ethane or propane, when combined with bitumen, form two liquid phases, as illustrated in FIG. 1. Field tests with ethane have also indicated that ethane-bitumen mixtures exhibit a lighter, deasphalted liquid phase and a heavy liquid phase.

The embodiment illustrated in FIG. 3 best suits an SDRP in which the wells' produced fluids are of similar quality, and where wells may comprise a fluid with two liquid phases. However, in cases where a subset of the wells are producing a fluid substantially different in quality from another subset of wells, it may be advantageous to not mix the produced fluid of all of the wells prior to feeding into a liquid-liquid separation vessel (306). Field observations of the quality of the produced oil in SDRPs show that the quality of the produced fluid may vary with time. For example, in a cyclic SDRP, the quality of the oil produced shortly after injection ceases and production begins may be higher than the quality of the oil produced towards the end of the production cycle. A well may produce only a light liquid phase for a time, then both a light and heavy phase for a time, and finally only a single heavy phase. In such a case, the produced fluids may be introduced directly into the process vessels (312, 314) appropriate for their quality. In practice, a densitometer may be installed in the field to measure the density of the produced fluid, and the fluid routed to the appropriate process vessel (306, 312, 314) depending on the density (medium, light, or heavy).

As discussed above, depending on the solvent used, more than two phases could be produced and could be processed as described above. Alternatively, the number of streams could be less than the number of phases. For example, where there are three phases, heavy, middle, and light, the middle phase could be separated with either the heavy or the light phase. As always, the aqueous phase is excluded from this discussion for simplicity of description.

Table 1 outlines the operating ranges for CSDRPs of some embodiments. The present invention is not intended to be limited by such operating ranges.

| Parameter | Broader Embodiment | Narrower Embodiment |
| --- | --- | --- |
| Injectant volume | Fill-up estimated pattern pore volume plus 2-15% of estimated pattern pore volume; or inject, beyond a pressure threshold, for a period of time (e.g. weeks to months); or inject, beyond a pressure threshold, 2-15% of estimated pore volume. | Inject, beyond a pressure threshold, 2-15% (or 3-8%) of estimated pore volume. |
| Injectant composition, main | Main solvent (>50 mass %) $C_2$-$C_5$. Alternatively, wells may be subjected to compositions other than main solvents to improve well pattern performance (i.e. $CO_2$ flooding of a mature operation or altering in-situ stress of reservoir). | Main solvent (>50 mass %) is propane ($C_3$). |
| Injectant composition, additive | Additional injectants may include $CO_2$ (up to about 30%), $C_{3+}$, viscosifiers (e.g. diesel, viscous oil, bitumen, diluent), ketones, alcohols, sulphur dioxide, hydrate inhibitors, and steam. | Only diluent, and only when needed to achieve adequate injection pressure. |
| Injectant phase & Injection pressure | Solvent injected such that at the end of injection, greater than 25% by mass of the solvent exists as a liquid in the reservoir, with no constraint as to whether most solvent is injected above or below dilation pressure or fracture pressure. | Solvent injected as a liquid, and most solvent injected just under fracture pressure and above dilation pressure, $P_{fracture} > P_{injection} > P_{dilation} > P_{vapor}$P. |
| Injectant temperature | Enough heat to prevent hydrates and locally enhance wellbore inflow consistent with Boberg-Lantz mode | Enough heat to prevent hydrates with a safety margin, $T_{hydrate} + 5°$ C. to $T_{hydrate} + 50°$ C. |
| Injection rate | 0.1 to 10 $m^3$/day per meter of completed well length (rate expressed as volumes of liquid solvent at reservoir conditions). | 0.2 to 2 $m^3$/day per meter of completed well length (rate expressed as volumes of liquid solvent at reservoir conditions). Rates may also be designed to allow for limited or controlled fracture extent, at fracture pressure or desired solvent conformance depending on reservoir properties. |
| Threshold pressure (pressure at which solvent continues to be injected for either a period of time or in a volume amount) | Any pressure above initial reservoir pressure. | A pressure between 90% and 100% of fracture pressure. |
| Well length | As long of a horizontal well as can practically be drilled; or the entire pay thickness for vertical wells. | 500 m-1500 m (commercial well). |
| Well configuration | Horizontal wells parallel to each other, separated by some regular spacing of 60-600 m; Also vertical wells, high angle slant wells & multi-lateral wells. Also infill injection and/or production wells (of any type above) targeting bypassed hydrocarbon from surveillance of pattern performance. | Horizontal wells parallel to each other, separated by some regular spacing of 60-320 m. |
| Well orientation | Orientated in any direction. | Horizontal wells orientated perpendicular to (or with less than 30 degrees of variation) the direction of maximum horizontal in-situ stress. |
| Minimum producing pressure (MPP) | Generally, the range of the MPP should be, on the low end, a pressure significantly below the vapor pressure, ensuring vaporization; and, on the high-end, a high pressure near the native reservoir pressure. For example, perhaps | A low pressure below the vapor pressure of the main solvent, ensuring vaporization, or, in the limited vaporization scheme, a high pressure above the vapor pressure. At 500 m depth with pure propane, 0.5 MPa (low)-1.5 MPa (high), values that bound the 800 kPa vapor pressure of |

-continued

| Parameter | Broader Embodiment | Narrower Embodiment |
|---|---|---|
| | 0.1 MPa-5 MPa, depending on depth and mode of operation (all-liquid or limited vaporization). | propane. |
| Oil rate | Switch to injection when rate equals 2 to 50% of the max rate obtained during the cycle; Alternatively, switch when absolute rate equals a pre-set value. Alternatively, well is unable to sustain hydrocarbon flow (continuous or intermittent) by primary production against backpressure of gathering system or well is "pumped off" unable to sustain flow from artificial lift. Alternatively, well is out of sync with adjacent well cycles. | Switch when the instantaneous oil rate declines below the calendar day oil rate (CDOR) (e.g. total oil/total cycle length). Likely most economically optimal when the oil rate is at about 0.8 × CDOR. Alternatively, switch to injection when rate equals 20-40% of the max rate obtained during the cycle. |
| Gas rate | Switch to injection when gas rate exceeds the capacity of the pumping or gas venting system. Well is unable to sustain hydrocarbon flow (continuous or intermittent) by primary production against backpressure of gathering system with/or without compression facilities. | Switch to injection when gas rate exceeds the capacity of the pumping or gas venting system. During production, an optimal strategy is one that limits gas production and maximizes liquid from a horizontal well. |
| Oil to Solvent Ratio | Begin another cycle if the OISR of the just completed cycle is above 0.15 or economic threshold. | Begin another cycle if the OISR of the just completed cycle is above 0.3. |
| Abandonment pressure (pressure at which well is produced after CSDRP cycles are completed) | Atmospheric or a value at which all of the solvent is vaporized. | For propane and a depth of 500 m, about 340 kPa, the likely lowest obtainable bottomhole pressure at the operating depth and well below the value at which all of the propane is vaporized. |

In Table 1, embodiments may be formed by combining two or more parameters and, for brevity and clarity, each of these combinations will not be individually listed.

In the context of this specification, diluent means a liquid compound that can be used to dilute the solvent and can be used to manipulate the viscosity of any resulting solvent-bitumen mixture. By such manipulation of the viscosity of the solvent-bitumen (and diluent) mixture, the invasion, mobility, and distribution of solvent in the reservoir can be controlled so as to increase viscous oil production.

The diluent is typically a viscous hydrocarbon liquid, especially a $C_4$ to $C_{20}$ hydrocarbon, or mixture thereof, is commonly locally produced and is typically used to thin bitumen to pipeline specifications. Pentane, hexane, and heptane are commonly components of such diluents. Bitumen itself can be used to modify the viscosity of the injected fluid, often in conjunction with ethane solvent.

In certain embodiments, the diluent may have an average initial boiling point close to the boiling point of pentane (36° C.) or hexane (69° C.) though the average boiling point (defined further below) may change with reuse as the mix changes (some of the solvent originating among the recovered viscous oil fractions). Preferably, more than 50% by weight of the diluent has an average boiling point lower than the boiling point of decane (174° C.). More preferably, more than 75% by weight, especially more than 80% by weight, and particularly more than 90% by weight of the diluent, has an average boiling point between the boiling point of pentane and the boiling point of decane. In further preferred embodiments, the diluent has an average boiling point close to the boiling point of hexane (69° C.) or heptane (98° C.), or even water (100° C.).

In additional embodiments, more than 50% by weight of the diluent (particularly more than 75% or 80% by weight and especially more than 90% by weight) has a boiling point between the boiling points of pentane and decane. In other embodiments, more than 50% by weight of the diluent has a boiling point between the boiling points of hexane (69° C.) and nonane (151° C.), particularly between the boiling points of heptane (98° C.) and octane (126° C.).

By average boiling point of the diluent, we mean the boiling point of the diluent remaining after half (by weight) of a starting amount of diluent has been boiled off as defined by ASTM D 2887 (1997), for example. The average boiling point can be determined by gas chromatographic methods or more tediously by distillation. Boiling points are defined as the boiling points at atmospheric pressure.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A method of producing hydrocarbons from an underground reservoir, the method comprising:
   (a) injecting a viscosity-reducing solvent into the reservoir;
   (b) producing a fluid stream from the reservoir comprising two liquid hydrocarbon phases;
   (c) at least partially separating the two liquid hydrocarbon phases into a lighter stream and a heavier stream;
   (d) at least partially recovering the viscosity-reducing solvent from each of the lighter stream and the heavier stream to form a lighter solvent-stripped liquid stream and a heavier solvent-stripped liquid stream; and
   (e) re-injecting at least a portion of the viscosity-reducing solvent recovered from one or both of the lighter and heavier streams, into the reservoir.

2. The method of claim 1, wherein the viscosity-reducing solvent is injected as part of an injected fluid, the injected fluid comprising greater than 50 mass % of the viscosity-reducing solvent.

3. The method of claim 2, wherein immediately after halting injection of the viscosity-reducing solvent into the reservoir, at least 25 mass % of the viscosity-reducing solvent is in a liquid state in the reservoir.

4. The method of claim 2, wherein the injected fluid comprises greater than 75 mass % of the viscosity-reducing solvent.

5. The method of claim 2, wherein the injected fluid further comprises diesel, viscous oil, bitumen, or diluent, to provide flow assurance.

6. The method of claim 2, wherein the injected fluid further comprises $CO_2$, natural gas, $C_{3+}$ hydrocarbons, ketones, or alcohols.

7. The method of claim 1, wherein at least 25 mass % of the viscosity-reducing solvent enters the reservoir as a liquid.

8. The method of claim 1, wherein at least 50 mass % of the viscosity-reducing solvent enters the reservoir as a liquid.

9. The method of claim 1, wherein the viscosity-reducing solvent comprises greater than 50 mass % of a $C_2$-$C_5$ paraffinic hydrocarbon solvent.

10. The method of claim 1, wherein the viscosity-reducing solvent comprises greater than 50 mass % propane.

11. The method of claim 1, wherein the viscosity-reducing solvent comprises greater than 70 mass % propane.

12. The method of claim 1, wherein the viscosity-reducing solvent comprises greater than 20 mass % ethane.

13. The method of claim 1, wherein the viscosity-reducing solvent comprises $CO_2$.

14. The method of claim 1, wherein the two hydrocarbon phases are at least partially separated by gravity settling.

15. The method of claim 1, wherein the two hydrocarbon phases are at least partially separated by applying centrifugal forces.

16. The method of claim 1, wherein the viscosity-reducing solvent is separated from a stream by flashing.

17. The method of claim 1, wherein the separation is effected in a continuous manner, with the fluid stream injected in a separation vessel and the lighter and heavier streams removed from a top and bottom of the separation vessel, respectively.

18. The method of claim 1, wherein the heavier solvent-stripped liquid stream has a MicroCarbon Residue of more than double the MicroCarbon Residue of the lighter solvent-stripped liquid stream.

19. The method of claim 1, wherein the heavier solvent-stripped liquid stream has a density at least 5% greater than a density of the lighter solvent-stripped liquid stream at 25° C. and atmospheric pressure.

20. The method of claim 1, wherein the lighter solvent-stripped liquid stream has a viscosity at 25° C. of at least an order of magnitude less than the heavier solvent-stripped liquid stream.

21. The method of claim 1, further comprising pipelining, without adding diluent, the lighter solvent-stripped liquid stream.

22. The method of claim 1, further comprising adding diluent to the heavier solvent-stripped liquid stream and then pipelining a resultant stream.

23. The method of claim 1, further comprising transporting the lighter and heavier solvent-stripped liquid streams to different locations.

24. The method of claim 1, further comprising transporting the lighter and heavier solvent-stripped liquid streams in block operation in a single pipeline.

25. The method of claim 1, further comprising combusting the heavier solvent-stripped liquid stream to provide power and heat for local oil production or upgrading operations.

26. The method of claim 25, further comprising combusting the heavier solvent-stripped liquid stream to provide heat for a thermal viscous oil recovery process.

27. The method of claim 1, further comprising sending the heavier solvent-stripped liquid stream to an upgrader.

28. The method of claim 1, further comprising sending the lighter solvent-stripped liquid stream to a coker.

29. The method of claim 1, wherein the hydrocarbons are a viscous oil having an in situ viscosity of at least 10 cP at initial reservoir conditions.

30. The method of claim 1, wherein the method of producing hydrocarbons is a cyclic solvent-dominated recovery process.

31. The method of claim 30, wherein the cyclic solvent-dominated oil recovery process comprises:
   (a) injecting a fluid comprising greater than 50 mass % of the viscosity-reducing solvent into an injection well completed in the reservoir;
   (b) halting injection into the injection well and subsequently producing at least a fraction of the injected fluid and the hydrocarbons from the reservoir through a production well;
   (c) halting production through the production well; and
   (d) subsequently repeating the cycle of steps (a) to (c).

32. The method of claim 31, wherein the injection well and the production well share a common wellbore.

33. The method of claim 1, wherein step (e) comprises re-injecting at least a portion of the viscosity-reducing solvent recovered from the lighter stream, and at least a portion of the viscosity-reducing solvent recovered from the heavier stream, into the reservoir.

* * * * *